Shellenback & Augspurger,
Rotary Steam Engine.
N° 77,221. Patented Apr. 28, 1868.

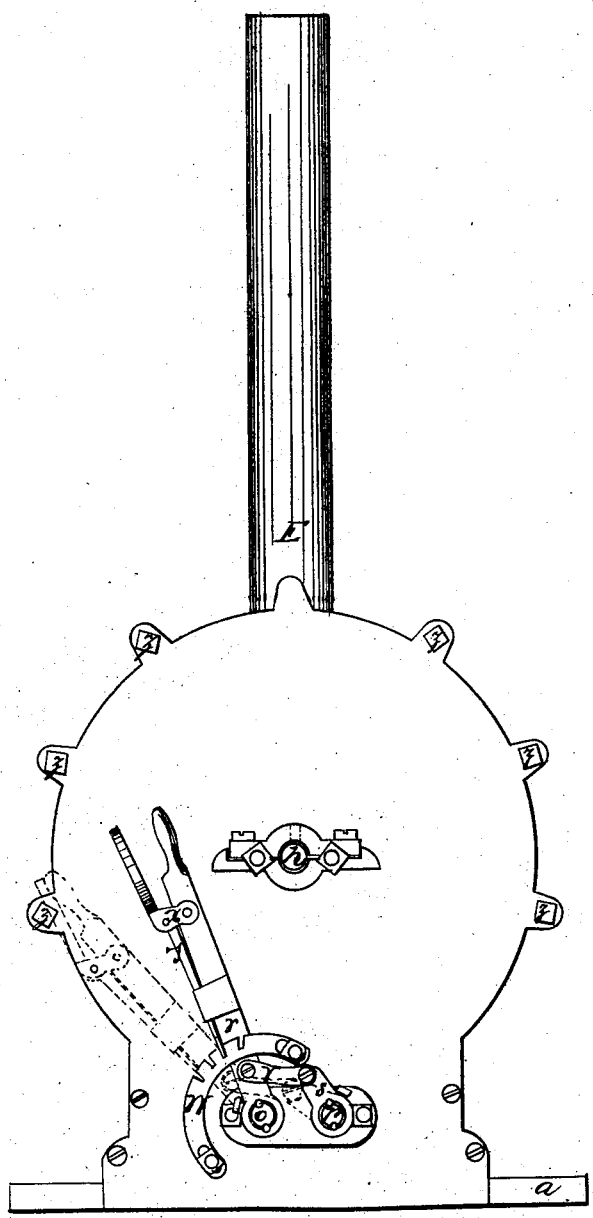

2 Sheets, Sheet 2.

Witnesses:
James Bowman
J. H. Miller

Inventor:
P. Shellenback
John Augspurger
By their atty.
H. P. K. Peck

United States Patent Office.

PETER SHELLENBACK AND JOHN AUGSPURGER, OF MIDDLETOWN, OHIO, ASSIGNORS TO PETER SHELLENBACK AND JAMES HUDSON.

Letters Patent No. 77,221, dated April 28, 1868.

IMPROVEMENT IN ROTARY STEAM-ENGINES.

The Schedule referred to in these Letters Patent and making part of the same.

TO ALL WHOM IT MAY CONCERN:

Be it known that we, PETER SHELLENBACK and JOHN AUGSPURGER, of Middletown, in Butler county, in the State of Ohio, have invented certain new and useful Improvements in Rotary Steam-Engines; and we do hereby declare that the following is a full and exact description thereof, reference being had to the accompanying drawings, and to the letters of reference marked thereon.

Figure 1 represents a side elevation of our engine.

Figure 3:
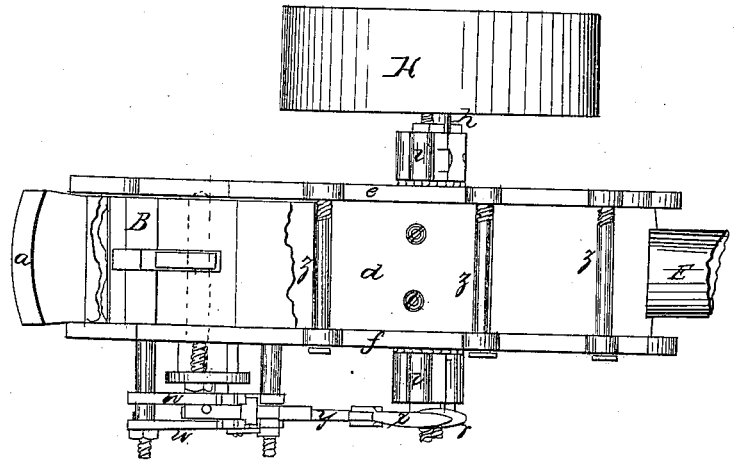
Figure 3 is an edge view, with a portion of the drum represented as broken away.

To enable others to construct our improved steam-engine, we will proceed to describe the same with reference to the accompanying drawings, which are made a part of this specification.

The operating-mechanism of our engine is enclosed within a chamber, formed by the base, $a\ b\ c$, drum $d$, and the two side-plates $e$ and $f$. The cylindrical nut A, provided with the four recesses $g$, in which four sliding vanes or pistons, $j$, are inserted, is centrally placed within the chamber, and has a suitable shaft, $h$, inserted in the centre thereof, to allow it to freely rotate. The shaft $h$ is journalled in boxes $i$, connected with the plates $e$ and $f$, as represented in the drawings.

Figure 2:
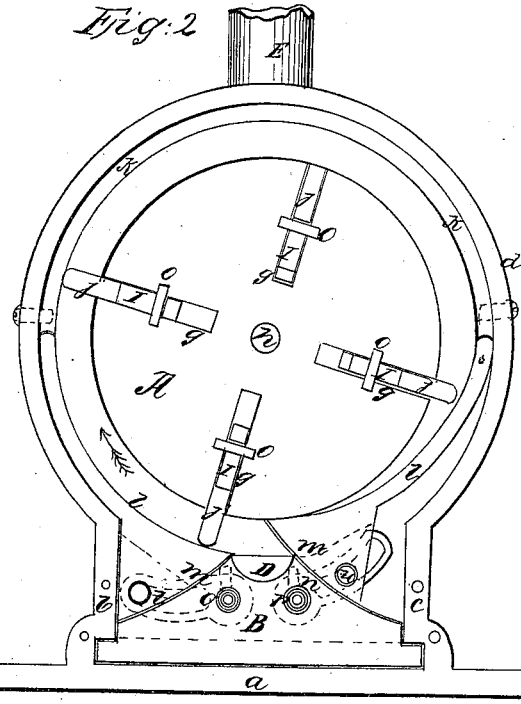
Figure 2 represents a similar view, with one of the side-plates removed to exhibit the working parts.

K is a circular plate within the upper portion of the drum, having curved seats or sockets, against which the ends of the adjustable sliding valves $l$ are seated. The lower ends of the valves $l$ are formed with curved lugs, $m$, which are recessed, to receive the ends of the slotted arms $n$, seen in dotted lines, (fig. 2.) The arms $n$ are keyed to shafts $o\ p$, which extend through the angular slotted block B, and project through the plate $f$, where they have connected with them the adjusting-levers $r\ s$. The pins $t$ and $u$, in the lugs $m$, pass through the curved slots of the arms $n$. Suitable journal and packing-boxes connect the plates $e$ and $f$ and the several journals which enter the chamber.

The levers $s$ and $r$ may be adjusted in different relations upon their respective shafts, $o\ p$, to compensate for any wear upon the valves $l$, which are operated or reversed, by the levers $r\ s$, to change the direction of the movement of the engine. These levers $r\ s$ are connected together by the link $v$. The longer lever, $r$, extends upward between the notched segmental supports $w$, which are connected, by screw-bolts, to the plate $f$. The angular thumb-piece $x$ is hinged to the lever $r$, and serves to throw the sliding stop $y$ into or out of connection with the notches in the segmental frame $w$, whereby either of the valves $l$ may be elevated to and be retained in contact with the periphery of the revolving nut A. The plates $e\ f$ are firmly retained in contact with the edges of the drum or cylindrical rim $d$ by bolts $z$.

The steam is admitted through a suitable orifice, D, and, after acting upon the pistons $j$, is allowed to escape through the vertical pipe E.

Springs may be inserted in the seats of the pistons $j$, to assist the centrifugal force, if necessary, to cause the pistons to be thrown outwards after being forced up in their seats by the valves $l$.

By the action of lever $r$, the sliding valves $l\ l$ may, at all times, be reversed in position, because the lever $s$ is connected with lever $r$ by the pivoted link $v$, and both levers are keyed to short shafts, $o$ and $p$, to which the curved slotted arms (occupying the groove in block B) are also keyed, as represented. The pins $t$ and $u$ connect the slotted curved arms $n$ with the lugs $m$ of valves $l$, and, consequently, the movement of lever $r$ will simultaneously operate valves $l$, and the sliding catch $y$ will serve to fasten the valves in such position, as required. As the steam is introduced through orifice D, the direction of the movement of nut or cylinder A will be determined by the position occupied by the valves $l\ l$. The vanes or pistons $j$ are of the proper width and dimensions to freely slide within their seats, and also to fit, when thrown outwardly, the space between the plates $e$ and $f$ and the nut and drum or rim $d$.

When the engine is operating, the vanes $j$, as they pass by the elevated end of the valve, which is, for the time, elevated in contact with the periphery of nut A, will be thrust outwards into the position as represented at No. 1 in fig. 2, and the force of the steam will act upon the vanes, to cause the rotation of the nut A and its central shaft, which carries the pulley H.

From the foregoing description, it will be seen that our rotary engine is capable of being reversed in its movement without the danger of shocking the machinery, and with the greatest ease and facility.

The vanes $j$ may be made with recesses, I, for the purpose of inserting a tie, O, on one or both sides, to retain the vanes in proper position, and govern their movements.

Having fully described our invention, what we claim, and desire to secure by Letters Patent, is—

1. The valves $l\ l$, constructed, arranged, and applied in combination with the nut A and its sliding pistons $j$, in the manner and for the purpose substantially as described:

2. The combination, in a rotary steam-engine, of the slotted block B, and lugs $m$, curved slotted arms $n\ n$, levers $r\ s$, and their connecting-mechanism, for reversing the action of the engine, in the manner and for the purpose specified.

3. The arrangement of the induction-orifice D in relation to the exhaust-pipe E, and the valves $l\ l$, and pistons $j$, in the manner and for the purpose described.

In testimony whereof, we have hereunto set our hands, this 16th day of September, 1867.

PETER SHELLENBACK,
JOHN AUGSPURGER.

Witnesses:
G. PHIPPS,
H. P. K. PECK.